United States Patent
Voda et al.

[11] Patent Number: 6,095,310
[45] Date of Patent: Aug. 1, 2000

[54] GEAR LOCK

[75] Inventors: Binyamin Voda; Vladimir Dvilensky, both of Tel Aviv, Israel

[73] Assignee: Gear Protection Ltd., Azur, Israel

[21] Appl. No.: 08/983,429

[22] PCT Filed: May 1, 1997

[86] PCT No.: PCT/IL97/00144

§ 371 Date: Apr. 2, 1999

§ 102(e) Date: Apr. 2, 1999

[87] PCT Pub. No.: WO98/50245

PCT Pub. Date: Nov. 12, 1998

[51] Int. Cl.[7] .................................................. B60K 41/26
[52] U.S. Cl. ..................... 192/220.6; 192/220.4; 192/39; 192/40; 192/71
[58] Field of Search .............. 192/220.2, 220.3, 192/220.4, 220.6, 71, 39, 40

[56] References Cited

U.S. PATENT DOCUMENTS

| | | |
|---|---|---|
| 3,583,184 | 6/1971 | Papale . |
| 3,844,180 | 10/1974 | Williams et al. . |
| 3,994,183 | 11/1976 | Markl . |
| 4,031,977 | 6/1977 | Grosseau . |
| 4,326,432 | 4/1982 | Miller . |
| 4,671,085 | 6/1987 | Yamaguchi et al. . |
| 4,679,417 | 7/1987 | Van Cise, Jr. . |
| 4,884,654 | 12/1989 | Durigon . |
| 5,014,831 | 5/1991 | Wawra et al. ................... 192/220.4 X |
| 5,211,078 | 5/1993 | McCarthy et al. . |
| 5,827,149 | 10/1998 | Sponable .................... 192/220.4 X |
| 5,862,899 | 1/1999 | Dahlstrom ..................... 192/220.4 |

*Primary Examiner*—Charles A Marmor
*Assistant Examiner*—Saùl Rodriguez
*Attorney, Agent, or Firm*—Darby & Darby

[57] ABSTRACT

Apparatus (102) for locking a gear assembly (11) of a vehicle (10), the apparatus for locking including apparatus for lockably engaging a predetermined portion of the gear assembly (102), and apparatus for selectably operating the apparatus for lockably engaging so as to lockably engage the predetermined portion of the gear assembly (24), characterized by the apparatus for lockably engaging including a shaft receiving portion formed with an aperture which engages a shaft of the gear assembly, wherein the shaft receiving portion is provided with a ratchet wheel (114) lockingly engageable by a pawl (116), the pawl being actuable by the apparatus for selectably operating, such that when the pawl is in a predetermined orientation with the ratchet wheel, the shaft cannot be rotated to operate the gear assembly.

9 Claims, 4 Drawing Sheets

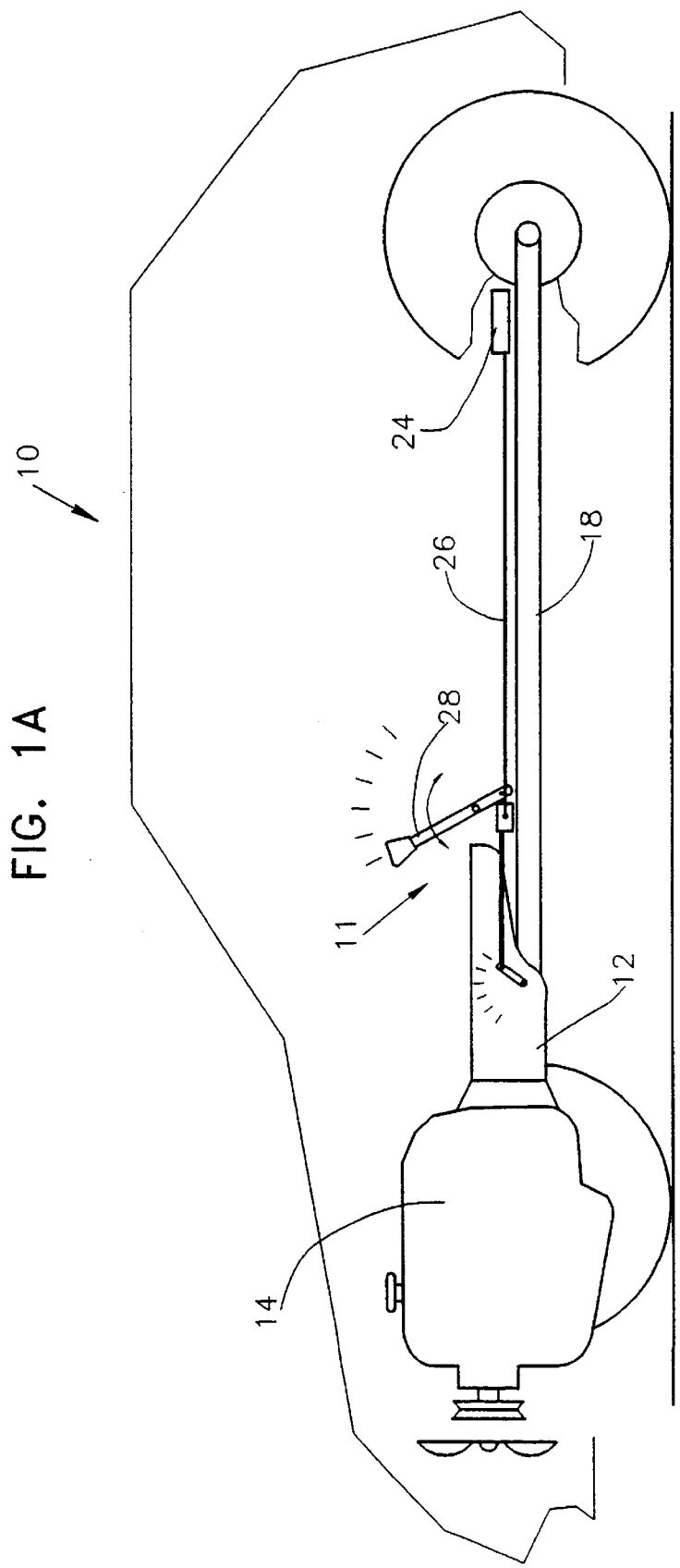

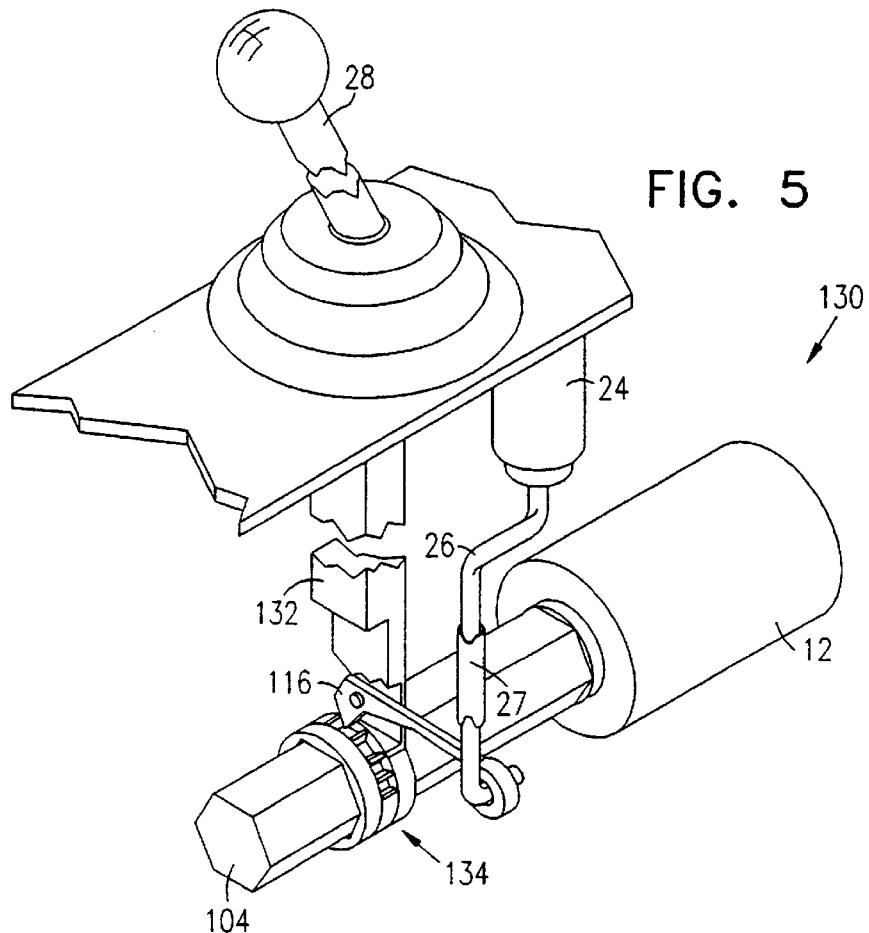
FIG. 5
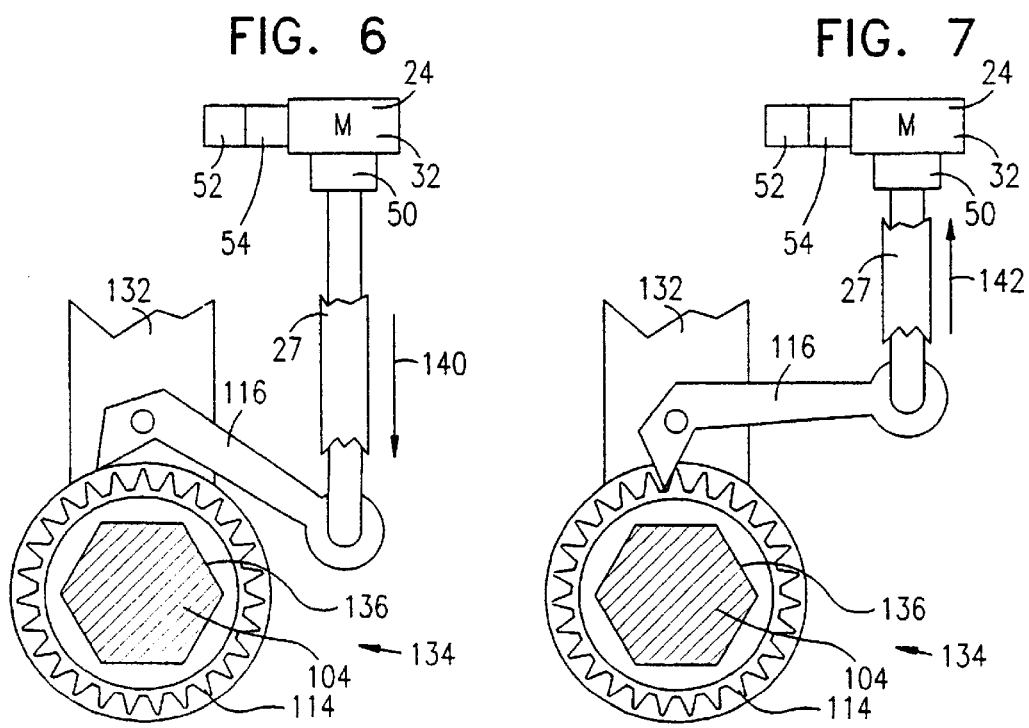
FIG. 6
FIG. 7

GEAR LOCK

FIELD OF THE INVENTION

The present invention relates, in general, to anti-theft devices for vehicles and, more particularly, to devices for locking the gears of a vehicle.

BACKGROUND OF THE INVENTION

The theft of vehicles, and particularly of private cars, is a phenomenon that has generated many different types of vehicle antitheft systems. Among these systems are various types of devices that lock a portion of the vehicle so as to make it undrivable. Among such devices are those mounted internally of the vehicle and arranged to lock the gear lever in a predetermined position so as to prevent an unauthorized person from being able to move the gear lever and thus drive the vehicle.

A disadvantage of internally mounted gear locking devices is that they may be unsightly and a vehicle owner may, therefore, be reluctant to install such a device.

Two representative gear locking devices of the art are U.S. Pat. No. 4,671,085 to Yamaguchi et al. and U.S. Pat. No. 4,884,654 to Durigon. Yamaguchi et al. describes a vehicle gear shift lever locking apparatus including a key operated lock mounted on a steering column of a vehicle and for controlling the ignition system thereof, and a safety coupling means coupled between a steering column mounted lock and a remotely mounted shift lever. The coupling means is adapted to prevent movement of the shift lever with the lock in an off position and to allow movement of the lever with the lock in an on position. The apparatus includes a latch mechanism mounted on the steering column and responsive to movement of the lock.

Durigon describes a transmission control locking device adapted to disable the drive train of a motor vehicle. The device includes remotely controllable locking means adapted releasably to lock an actuator member constituted by a transmission gear selector level in a predetermined position when the lever is moved to that position, the predetermined position of the lever with the position of a gear selection that disables the vehicle drive train by the disengagement of the transmission therefrom.

The present applicant discloses in Israel Patent Application 091763, filed Sep. 24, 1989, apparatus for locking a gear assembly of a vehicle which overcomes disadvantages of the above art. The apparatus for locking the gear assembly includes apparatus, mounted beneath the vehicle, for lockably engaging a predetermined portion of the gear assembly. The predetermined portion is preferably a hand operated first, automatic gear selector lever extending partially into the interior of the vehicle. There is also provided a second, automatic gear actuator lever associated directly with the vehicle gearbox and located beneath the vehicle, the first lever being operative to rotate the second lever via an intermediate member hingedly connected to both the first and second levers, thereby to permit selection of a gear from the interior of the vehicle, the apparatus for lockably engaging being operative to lockably engage a predetermined portion of the first lever in a first predetermined position so as to cause the second lever to become locked in a second predetermined position corresponding to the first predetermined position. Apparatus is provided for selectably operating the apparatus for lockably engaging so as to lockably engage the predetermined portion of the gear assembly. Preferably the apparatus for selectably operating includes remotely actuable apparatus.

Alternatively, the predetermined portion is the selector lever for a manual gearbox and has a first portion extending into the interior of the vehicle and a second portion located beneath the vehicle, the apparatus for lockably engaging also including a scissors-like assembly attached to the second end portion of the elongate member and being closable about the second portion of the gear selector lever so as to lock it in a substantially immovable position.

SUMMARY OF THE INVENTION

The present invention seeks to provide novel gear locking apparatus for a vehicle which further improves the apparatus disclosed in Applicant's Israel Patent Application 091763, and which provides novel and improved features over the known art.

There is thus provided in accordance with a preferred embodiment of the invention, apparatus for locking a gear assembly of a vehicle, the apparatus for locking including apparatus for lockably engaging a predetermined portion of the gear assembly, and apparatus for selectably operating the apparatus for lockably engaging so as to lockably engage the predetermined portion of the gear assembly, characterized by the apparatus for lockably engaging including a shaft receiving portion formed with an aperture which engages a shaft of the gear assembly, wherein the shaft receiving portion is provided with a ratchet wheel lockingly engageable by a pawl, the pawl being actuable by the apparatus for selectably operating, such that when the pawl is in a predetermined orientation with the ratchet wheel, the shaft cannot be rotated to operate the gear assembly.

In accordance with a preferred embodiment of the invention, when the pawl is in locked engagement with the ratchet wheel, the shaft cannot be rotated to operate the gear assembly. Alternatively, when the pawl is disengaged from the ratchet wheel, the shaft cannot be rotated to operate the gear assembly.

Additionally in accordance with a preferred embodiment of the invention, the shaft receiving portion includes an extension of a link member that links a gear selector lever with the shaft of the gear assembly. Alternatively or additionally, the apparatus for lockably engaging includes a portion fixed to a structure of the vehicle.

Further in accordance with a preferred embodiment of the invention, the shaft receiving portion is not mechanically linked to a gear selector lever of the vehicle.

In accordance with a preferred embodiment of the invention, the apparatus for selectably operating includes remotely actuable apparatus.

Additionally in accordance with a preferred embodiment of the invention, the gear assembly is an automatic gear assembly and the predetermined portion is arranged to be lockably engaged in the "park" position.

Alternatively, the gear assembly is a manual gear assembly and the predetermined portion is arranged to be lockably engaged in any position whereat a gear is engaged.

There is also provided in accordance with a preferred embodiment of the present invention, a vehicle having a gear assembly and including apparatus for locking the gear assembly, the apparatus for locking including apparatus, mounted beneath the vehicle, for lockably engaging the predetermined portion of the gear assembly, and apparatus for selectably operating the apparatus for lockably engaging so as to lockably engage the predetermined portion of the gear assembly, characterized by the apparatus for lockably engaging including a shaft receiving portion formed with an aperture which engages a shaft of the gear assembly, wherein the shaft receiving portion is provided with a ratchet wheel lockingly engageable by a pawl, the pawl being actuable by the apparatus for selectably operating, such that when the pawl is in a predetermined orientation with the ratchet wheel, the shaft cannot be rotated to operate the gear assembly.

BRIEF DESCRIPTION OF THE DRAWINGS

The present invention will be more fully understood and appreciated from the following detailed description, taken in conjunction with the drawings, in which:

FIG. 1A is a schematic side view of a back-wheel driven vehicle with a gearbox and employing gear locking apparatus constructed and operative in accordance with an embodiment of the invention;

FIG. 5 is a simplified illustration of gear locking apparatus, constructed and operative in accordance with a preferred embodiment of the present invention; and FIGS. 6 and 7 are simplified illustrations of operation of the gear locking apparatus of FIG. 2 in accordance with the present invention.

DETAILED DESCRIPTION OF THE INVENTION

Figure 1B:
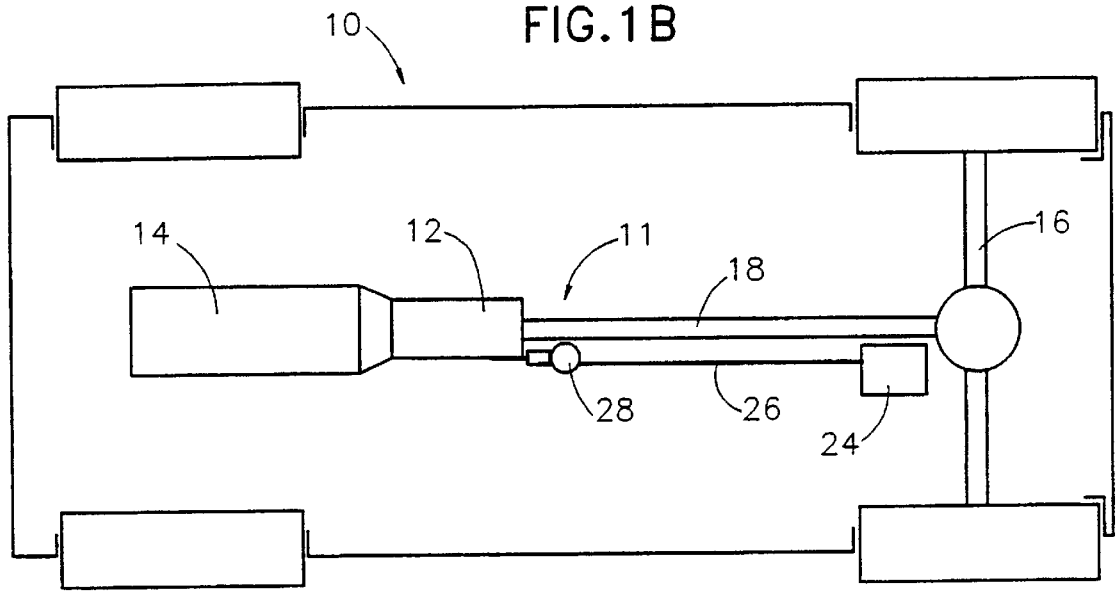
FIG. 1B is a bottom view of the vehicle of FIG. 1A.
Figure 1C:
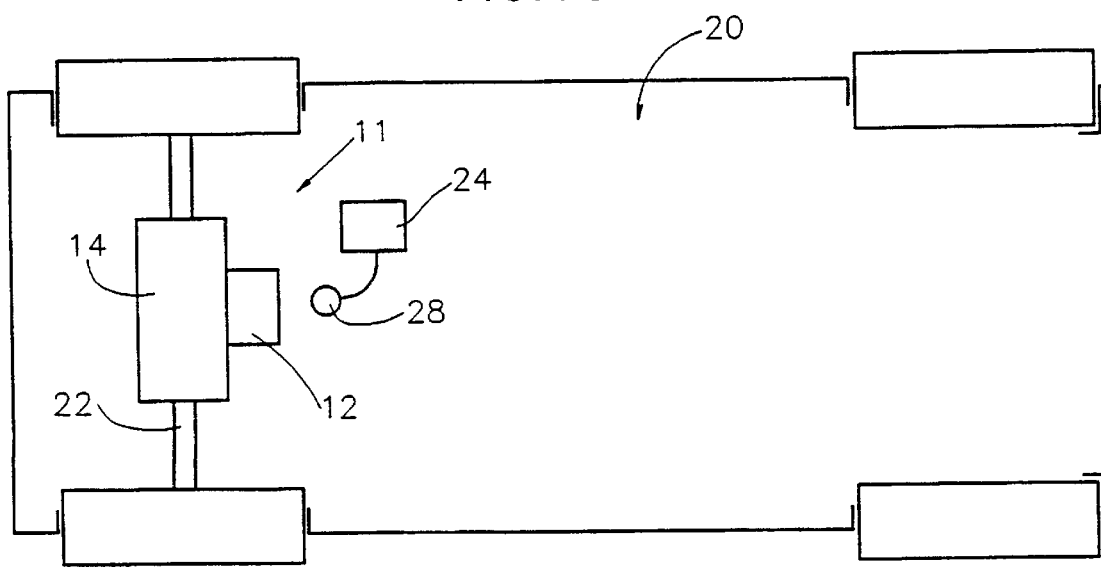
FIG. 1C is a view similar to that of FIG. 1B, but wherein the vehicle is a frontwheel driven vehicle.

Referring now to FIGS. 1A and 1B, there is shown a back-wheel driven vehicle, referenced generally 10, with a gear assembly, referenced generally 11, having a gearbox 12 adjacent an engine 14 operatively associated with the rear axle 16 of the vehicle via a drive shaft 18 thereof FIG. 1C is a bottom view of a front-wheel driven vehicle, referenced generally 20, also with a gearbox 12 adjacent an engine 14 operatively associated with the front axle 22 of the vehicle. The present invention is applicable both for automatic and manual transmission vehicles. Both vehicles 10 (FIGS. 1A and 1B) and 20 (FIG. 1C) employ gear locking apparatus constructed and operative in accordance with the present invention, and which is described in detail hereinbelow.

The gear locking apparatus of the invention comprises control apparatus 24, which, via an elongate member 26, is operative, to cause locked engagement of a lockable portion of the gear assembly 11 of the vehicle. In the shown embodiment, the lockable portion of the gear assembly is a gear selector lever 28. It will be appreciated that the precise location of the control apparatus is not limited to the typical locations shown in FIGS. 1A to 1C.

Figure 2:
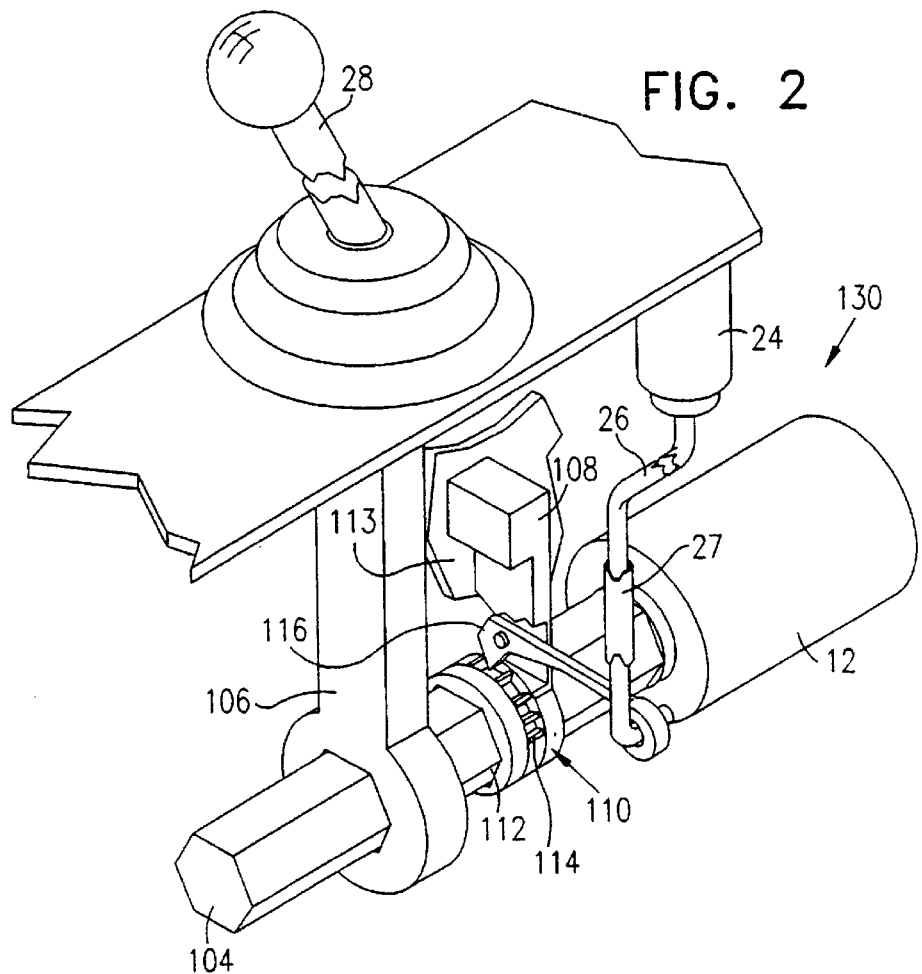
FIG. 2 is a simplified illustration of gear locking apparatus, constructed and operative in accordance with a preferred embodiment of the present invention.

Reference is now made to FIG. 2 which illustrates gear locking apparatus 102, constructed and operative in accordance with a preferred embodiment of the present invention. Gear selector lever 28 is illustrated for a manual transmission, although, as stated previously, the invention is equally applicable for an automatic transmission. Gear selector lever 28 is mechanically engaged with a shaft 104 of gearbox 12 by a link member 106. Gear locking apparatus 102 preferably includes a stationary member 108 which also engages shaft 104 via a shaft receiving portion 110 formed with an aperture 112. Stationary member 108 is preferably fixed to some structure of the vehicle, such as a bulkhead or wall 113 in the vicinity of gearbox 12, or alternatively, to some portion of gearbox 12 itself. Shaft 104 and aperture 112 are preferably correspondingly shaped with one or more flats to effect the mechanical engagement. For example, as illustrated, shaft 104 and aperture 112 may be correspondingly hexagonally shaped. Shaft receiving portion 110 is preferably formed with a ratchet wheel 114 engageable by a pawl 116. Pawl 116 is actuable by control apparatus 24 via elongate member 26.

Figure 3:
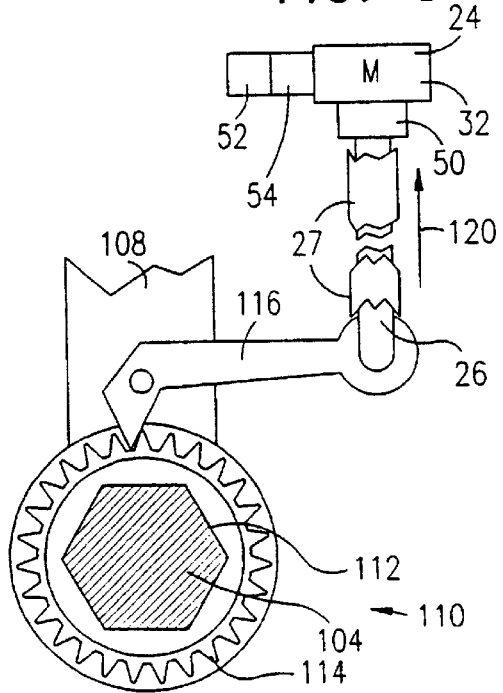
FIGS. 3 and 4 are simplified illustrations of operation of the gear locking apparatus of FIG. 2 in accordance with the present invention.
Figure 4:
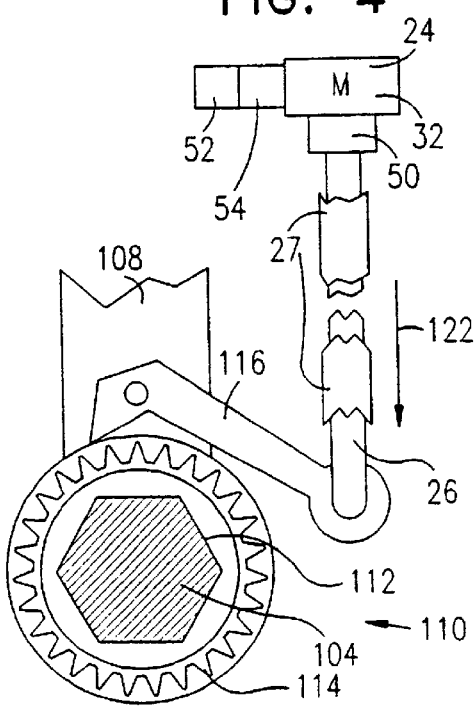

Reference is now made to FIGS. 3 and 4 which illustrate operation of gear locking apparatus 102 in accordance with the present invention. Control apparatus 24 may include a motor 32, preferably a gear motor, such as gear motor No. 0130-821-069, manufactured by Robert Bosch GmbH of Stuttgart, Germany. Alternatively, control apparatus 24 may include any other type of hydraulic, pneumatic, electrical or electronic actuator which may be used to move elongate member 26, and the terms "motor" and "actuator" are used interchangeably throughout the specification and claims.

Elongate member 26 may be a relatively flexible, metal, cable-like member, which engages control apparatus 24 by any known means, such as pinned or threaded engagement. Elongate member 26 is typically enclosed within a sheath 27, along most of its length, so as to prevent cutting of the elongate member by a person wishing to break into the vehicle.

In FIG. 3, control apparatus 24 may be used to move elongate member 26 generally in the direction of an arrow 120, thereby lockably engaging pawl 116 with ratchet wheel 114 and preventing rotation of ratchet wheel 114 and shaft 104. Thus, gear selector lever 28 and link member 106 are prevented from operating gearbox 12. Once pawl 116 has been moved to engage ratchet wheel 114 and the resistance of elongate member 26 to being moved any further in the direction of arrow 120 increases, a load detector 50 preferably deactivates motor 32 of control apparatus 24 upon detecting a predetermined load thereon. A suitable load detector is, for example, a PATROL HPS-40, marketed in Israel by AV-GAD Systems Ltd., Tel Aviv, Israel.

According to a preferred embodiment, motor 32 of locking apparatus 102 of the present invention is remotely actuable, and control apparatus 24 also includes a signal transmitter 52 and a signal receiver 54 which, when receiving a first predetermined signal from transmitter 52, activates motor 32 so as to move elongate member 26 in the direction of arrow 120 as previously described.

A typical signal transmitter suitable for use in the invention is the VM7001 remote control unit, manufactured by AV-GAD Systems Ltd., Tel Aviv, Israel. A typical signal receiver suitable for use in the invention is such as is employed in the AVD-2000 system, also manufactured by AV-GAD Systems Ltd.

Conversely, as illustrated in FIG. 4, control apparatus may be used to move elongate member 26 generally in the direction of an arrow 122, opposite to arrow 120, thereby disengaging pawl 116 with ratchet wheel 114 and permitting rotation of ratchet wheel 114 and shaft 104. For remote control operation, upon receiving a second predetermined signal, receiver 54 activates motor 32 so as to move elongate member in the direction of arrow 122. In the orientation of FIG. 4, gear selector lever 28 and link member 106 may be used to operate gearbox 12.

In the present embodiments, wherein gearbox 12 is a conventional automatic gearbox, locking apparatus 102 is preferably arranged to lock gear selector lever 28 in the "PARK" position. For a manual gearbox, gear selector lever 28 not need be locked in a predetermined position, but, may be locked in any position whereat a gear is engaged.

Reference is now made to FIG. 5 which illustrates gear locking apparatus 130, constructed and operative in accordance with another preferred embodiment of the present invention. In this embodiment, gear selector lever 28 is mechanically engaged with shaft 104 of gearbox 12 by a link member 132 which includes a shaft receiving portion 134 formed with an aperture 136. The rest of the structure of gear locking apparatus 130 is substantially identical to gear locking apparatus 102, with like elements being designated by like numerals, except that in gear locking apparatus 130 there is no stationary member 108. In addition, in gear locking apparatus 130, elongate member 26 is preferably relatively short and motor 32 of control apparatus 24 is preferably located relatively close to pawl 116. Motor 32 may be attached to any suitable structure in the vicinity of link member 132 or any other portion of gear locking apparatus 130.

Reference is now made to FIGS. 6 and 7 which illustrate operation of gear locking apparatus 130 in accordance with the present invention. The operation of gear locking apparatus 130 is essentially opposite that of gear locking apparatus 102. In FIG. 6, control apparatus 24 moves elongate member 26 generally in the direction of an arrow 140, thereby disengaging pawl 116 with ratchet wheel 114, and thus disengaging gear selector lever 28 and link member 132 from operating gearbox 12.

Conversely, as illustrated in FIG. 7, control apparatus may be used to move elongate member 26 generally in the direction of an arrow 142, opposite to arrow 140, thereby engaging pawl 116 with ratchet wheel 114 and permitting gear selector lever 28 and link member 132 to operate gearbox 12.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove, by way of example. The scope of the invention is limited, rather, solely by the claims, which follow:

What is claimed is:

1. Apparatus for locking a gear assembly of a vehicle, said apparatus for locking comprising:

apparatus for lockably engaging a predetermined portion of the gear assembly; and apparatus for selectably operating said apparatus for lockably engaging so as to lockably engages the predetermined portion of the gear assembly, characterized by said apparatus for lockably engaging comprising a shaft receiving portion formed with an aperture which engages a shaft of the gear assembly, wherein said shaft receiving portion is provided with a ratchet wheel lockingly engageable by a pawl, said pawl being actuable by said apparatus for selectably operating, such that when said pawl is in a perdetermined orientation with said ratchet wheel, said shaft cannot be rotated to operate the gear assembly, wherein when said pawl is disengaged from said ratchet wheel, said shaft cannot be rotated to operate the gear assembly.

2. Apparatus for locking a gear assembly of a vehicle, said apparatus for looking comprising:

apparatus for lockably engaging a predetermined portion of the gear assembly; and apparatus for selectably operating said apparatus for lockably engaging so as to lockably engage the predetermined portion of the gear assembly, characterized by said apparatus for lockably engaging comprising a shaft receiving portion formed with an aperture which engages a shaft of the gear assembly, wherein said shaft receiving portion is provided with a ratchet wheel lockingly engageable by a pawl, said pawl being actuable by said apparatus for selectably operating, such that when said pawl is in a predetermined orientation with said ratchet wheel, said shaft cannot be rotated to operate the gear assembly, wherein said shaft receiving portion comprises an extension of a link member that links a gear selector lever with said shaft of the gear assembly.

3. Apparatus according to claim 2 wherein said apparatus for lockably engaging comprises a portion fixed to a structure of the vehicle.

4. Apparatus according to claim 2 wherein said apparatus for selectably operating comprises remotely actuable apparatus.

5. Apparatus according to claim 2 and wherein the gear assembly is an automatic gear assembly and the predetermined portion is arranged to be lockably engaged in the "park" position.

6. Apparatus for locking a gear assembly of a vehicle, said apparatus for locking comprising:

apparatus for lockably engaging a predetermined portion of the gear assembly; and apparatus for selectably operating said apparatus for lockably engaging so as to lockably engage the predetermined portion of the gear assembly, characterized by said apparatus for lockably engaging comprising a shaft receiving portion formed with an aperture which engages a shaft of the gear assembly, wherein said shaft receiving portion is provided with a ratchet wheel lockingly engageable by a pawl, said pawl being actuable by said apparatus for selectably operating, such that when said pawl is in a predetermined orientation with said ratchet wheel, said shaft cannot be rotated to operate the gear assembly, wherein said shaft receiving portion is not mechanically linked to gear selector lever of the vehicle.

7. Apparatus for locking a gear assembly of a vehicle, said apparatus for locking comprising:

apparatus for lockably engaging a predetermined portion of the gear assembly; and apparatus for selectably operating said apparatus for lockably engaging so as to lockably engage the predetermined portion of the gear assembly, characterized by said apparatus for lockably engaging comprising a shaft receiving portion formed with an aperture which engages a shaft of the gear assembly, wherein said shaft receiving portion is provided with a ratchet wheel lockingly engageable by a pawl, said pawl being actuable by said apparatus for selectably operating, such that when said pawl is in a predetermined orientation with said ratchet wheel, said shaft cannot be rotated to operate the gear assembly, and wherein the gear assembly is a manual gear assembly and the predetermined portion is arranged to be lockably engaged in any position whereat a gear is engaged.

8. A vehicle having a gear assembly and including apparatus for locking said gear assembly, said apparatus for locking comprising:

apparatus, mounted beneath said vehicle, for lockably engaging said predetermined portion of said gear assembly; and apparatus for selectably operating said apparatus for lockably engaging so as to lockably engage the predetermined portion of the gear assembly, characterized by said apparatus for lockably engaging comprising a shaft receiving portion formed with an aperture which engages a shaft of the gear assembly, wherein said shaft receiving portion is provided with a ratchet wheel lockingly engageable by a pawl, said pawl being actuable by said apparatus for selectably operating, such that when said pawl is in a predetermined orientation with said ratchet wheel, said shaft cannot be rotated to operate the gear assembly, wherein when said pawl is disengaged from said ratchet wheel, said shaft cannot be rotated to operate the gear assembly.

9. A vehicle according to any of claim 8 and wherein said apparatus for selectably operating comprises remotely actuable apparatus.

* * * * *